United States Patent
Lee et al.

(10) Patent No.: US 7,386,640 B2
(45) Date of Patent: Jun. 10, 2008

(54) METHOD, APPARATUS AND SYSTEM TO GENERATE AN INTERRUPT BY MONITORING AN EXTERNAL INTERFACE

(75) Inventors: David C. Lee, Beaverton, OR (US); Steve Kulick, Portland, OR (US); Sivakumar Radhakrishnan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 11/025,381

(22) Filed: Dec. 28, 2004

(65) Prior Publication Data

US 2006/0143351 A1   Jun. 29, 2006

(51) Int. Cl.
*G06F 3/00* (2006.01)

(52) U.S. Cl. .................. 710/19; 710/48; 710/302; 710/260

(58) Field of Classification Search ............ 710/15–19, 710/48, 300–304, 306, 311, 313, 260, 266, 710/268

See application file for complete search history.

(56) References Cited

U.S. PATENT DOCUMENTS

| | | | |
|---|---|---|---|
| 5,434,980 A * | 7/1995 | Casper et al. ................ 710/11 |
| 5,742,847 A | 4/1998 | Knoll et al. |
| 6,279,067 B1 | 8/2001 | Callway et al. |
| 6,282,673 B1 * | 8/2001 | Liu et al. ..................... 714/25 |
| 6,286,060 B1 * | 9/2001 | DiGiorgio et al. ........... 710/31 |
| 6,697,963 B1 * | 2/2004 | Nouri et al. .................. 714/31 |
| 2002/0124007 A1 * | 9/2002 | Zhao .......................... 707/102 |
| 2002/0144043 A1 * | 10/2002 | Bennett et al. ............. 710/302 |
| 2003/0048615 A1 * | 3/2003 | King et al. .................. 361/724 |
| 2003/0167367 A1 * | 9/2003 | Kaushik et al. ............ 710/302 |
| 2003/0188066 A1 * | 10/2003 | Kwatra et al. ............. 710/260 |
| 2004/0003327 A1 * | 1/2004 | Joshi et al. .................. 714/47 |
| 2004/0243725 A1 * | 12/2004 | Yakovlev et al. ............. 710/1 |
| 2004/0258076 A1 | 12/2004 | Jha et al. |

OTHER PUBLICATIONS

Philips PCA 9555 I/O Expander, Jul. 2004.*
SMBus Definition, Interfacebus.com, unknown date.*
Comparing the I2C Bus to the SMBus, Dallas Semiconductor, Dec. 2000.*
Improving System Interrupt Management Using the PCF8574 and PCF8574A I/O Expander for the I2C Bus, Texas Instruments, Aug. 2001.*
MCP23016 16-Bit I2C I/O Expander, Microchip Technology Inc, 2003.*
Wasson, S., "ATI's Radeon Xpress 200 Chipset Radeon Graphics Goes Native", *The Tech Report* (2004) XP-002387704, whole document, <http://techreport.com/reviews/2004q4/radeon-xpress200/index.x?pp=1>.
International Application No.: PCT/US2005/047276, International Search Report, unknown date.

* cited by examiner

*Primary Examiner*—Khanh Dang
(74) *Attorney, Agent, or Firm*—David L. Guglielmi

(57) ABSTRACT

In some embodiments, a method, apparatus and system to generate an interrupt by monitoring an external interface are presented. In this regard, an interrupt agent is introduced to communicate over a serial interface with an input/output (I/O) extender and to save a relevant status of the I/O extender in a memory. Other embodiments are also disclosed and claimed.

12 Claims, 2 Drawing Sheets

US 7,386,640 B2

METHOD, APPARATUS AND SYSTEM TO GENERATE AN INTERRUPT BY MONITORING AN EXTERNAL INTERFACE

FIELD OF THE INVENTION

Embodiments of the present invention generally relate to the field of component signaling, and, more particularly to a method, apparatus and system to generate an interrupt by monitoring an external interface.

BACKGROUND OF THE INVENTION

Interrupts typically use signal traces to signal a system or component (such as a chipset) that a peripheral component needs to be serviced, perhaps because of a change in status. Software interrupt routines typically service these interrupts by inquiring into the details of the peripheral component by reading status registers and taking appropriate actions. There are currently objectives in the electronics industry to reduce signal traces where possible to reduce costs and to reduce system response times to improve performance.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention are generally directed to a method, apparatus and system to generate an interrupt by monitoring an external interface. In this regard, in accordance with but one example implementation of the broader teachings of the present invention, an interrupt agent is introduced. In accordance with but one example embodiment, the interrupt agent employs an innovative method to communicate over a serial interface with an input/output (I/O) extender, to save an relevant status of the I/O extender in a memory, and to periodically update the saved relevant status of the I/O extender. According to one example method, the interrupt agent may generate an interrupt based on a change in the relevant status of the I/O extender without the use of an interrupt signal from the I/O extender. According to another example method, the interrupt agent may program software to respond to a change in the relevant status of the I/O extender. The relevant status of the I/O extender may be a subset of all status registers that include active functions that are being monitored.

In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
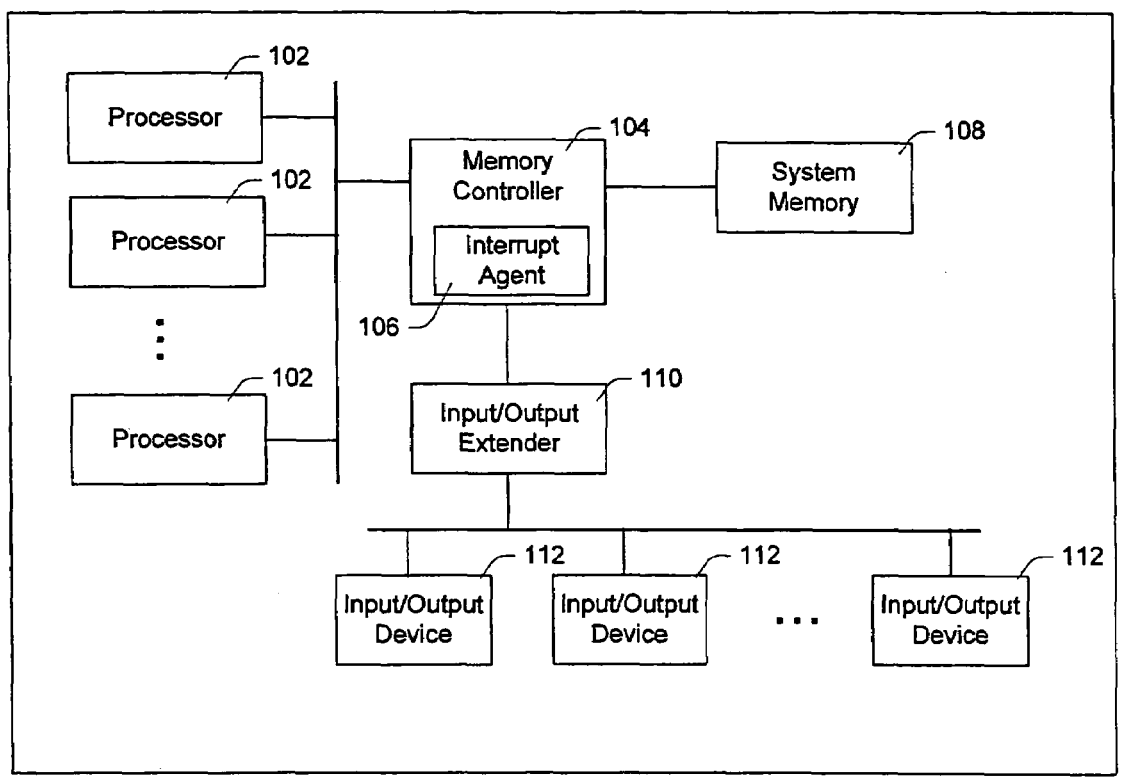
FIG. 1 is a block diagram of an example electronic appliance suitable for implementing an interrupt agent, in accordance with one example embodiment of the invention.

FIG. 1 is a block diagram of an example electronic appliance suitable for implementing an interrupt agent, in accordance with one example embodiment of the invention. Electronic appliance 100 is intended to represent any of a wide variety of traditional and non-traditional electronic appliances, laptops, desktops, cell phones, wireless communication subscriber units, wireless communication telephony infrastructure elements, personal digital assistants, set-top boxes, or any electric appliance that would benefit from the teachings of the present invention. In accordance with the illustrated example embodiment, electronic appliance 100 may include one or more of processor(s) 102, memory controller 104, interrupt agent 106, system memory 108, input/output extender 110, and input/output device(s) 112 coupled as shown in FIG. 1. Interrupt agent 106, as described more fully hereinafter, may well be used in electronic appliances of greater or lesser complexity than that depicted in FIG. 1. Also, the innovative attributes of interrupt agent 106 as described more fully hereinafter may well be embodied in any combination of hardware and software.

Processor(s) 102 may represent any of a wide variety of control logic including, but not limited to one or more of a microprocessor, a programmable logic device (PLD), programmable logic array (PLA), application specific integrated circuit (ASIC), a microcontroller, and the like, although the present invention is not limited in this respect.

Memory controller 104 may represent any type of chipset or control logic that interfaces system memory 108 with the other components of electronic appliance 100. In one embodiment, the connection between processor(s) 102 and memory controller 104 may be referred to as a front-side bus. In another embodiment, memory controller 104 may be referred to as a north bridge or memory controller hub (MCH).

Interrupt agent 106 may have an architecture as described in greater detail with reference to FIG. 2. Interrupt agent 106 may also perform one or more methods to generate an interrupt by monitoring an external interface, such as the method described in greater detail with reference to FIG. 3. While shown as being part of memory controller 104, interrupt agent 106 may well be part of another component, for example processor(s) 102, or may be implemented in software or a combination of hardware and software.

System memory 108 may represent any type of memory device(s) used to store data and instructions that may have been or will be used by processor(s) 102. Typically, though the invention is not limited in this respect, system memory 108 will consist of dynamic random access memory (DRAM). In one embodiment, system memory 108 may consist of Rambus DRAM (RDRAM). In another embodiment, system memory 108 may consist of double data rate synchronous DRAM (DDR SDRAM). The present invention, however, is not limited to the examples of memory mentioned here.

Input/output (I/O) extender 110 may represent any type of chipset or control logic that interfaces I/O device(s) 112 with the other components of electronic appliance 100. In one embodiment, I/O controller 110 may be a Philips PCA9555, or similar type, component. In another embodiment, I/O extender 110 may perform some of the functionality to allow electronic appliance 100 to comply with the Peripheral Component Interconnect (PCI) Standard Hot-Plug Controller (SHPC) and Subsystem Specification, Revision 1.0, PCI Special Interest Group, released Jun. 20, 2001. I/O extender 110 may have internal status registers relating to its operation and the operation of I/O device(s) 112.

Input/output (I/O) device(s) 112 may represent any type of device, peripheral or component that provides input to or processes output from electronic appliance 100. In one embodiment, though the present invention is not so limited, I/O device(s) 112 may comply with the PCI Express™ Base Specification, Revision 1.0a, PCI Special Interest Group, released Apr. 15, 2003.

Figure 2:
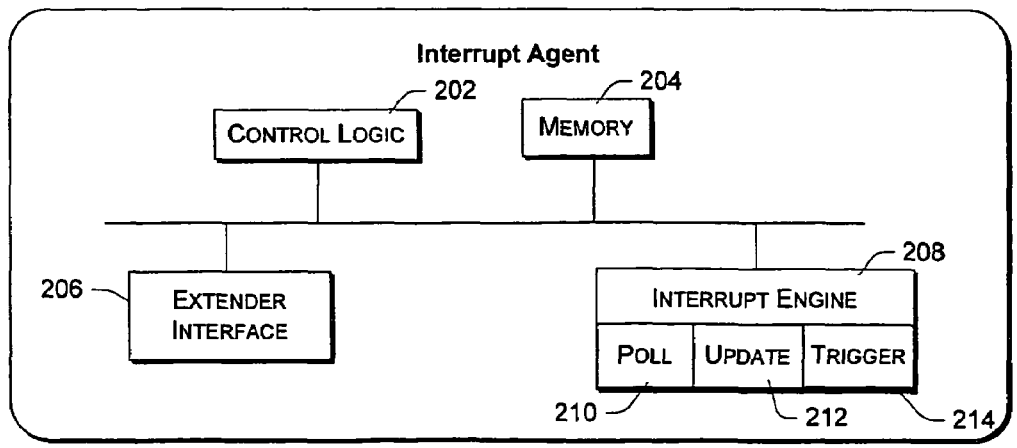
FIG. 2 is a block diagram of an example interrupt agent architecture, in accordance with one example embodiment of the invention.

FIG. 2 is a block diagram of an example interrupt agent architecture, in accordance with one example embodiment of the invention. As shown, interrupt agent 106 may include one or more of control logic 202, memory 204, extender interface 206, and interrupt engine 208 coupled as shown in FIG. 2. In accordance with one aspect of the present invention, to be developed more fully below, interrupt agent 106 may include an interrupt engine 208 comprising one or more of poll services 210, update services 212, and/or trigger services 214. It is to be appreciated that, although depicted as a number of disparate functional blocks, one or more of elements 202-214 may well be combined into one or more multi-functional blocks. Similarly, interrupt engine 208 may well be practiced with fewer functional blocks, i.e., with only update services 212, without deviating from the spirit and scope of the present invention, and may well be implemented in hardware, software, firmware, or any combination thereof. In this regard, interrupt agent 106 in general, and interrupt engine 208 in particular, are merely illustrative of one example implementation of one aspect of the present invention. As used herein, interrupt agent 106 may well be embodied in hardware, software, firmware and/or any combination thereof.

As introduced above, interrupt agent 106 may have the ability to communicate over a serial interface with an I/O extender, to save a relevant status of the I/O extender in a memory, and to periodically update the saved relevant status of the I/O extender. In one embodiment, interrupt agent 106 may generate an interrupt based on a change in the internal status of the I/O extender without the use of an interrupt signal from the I/O extender. In another embodiment, interrupt agent 106 may program software to respond to a change in the internal status of the I/O extender. One skilled in the art would appreciate that interrupt agent 106 may shorten interrupt service latency and reduce board traces.

As used herein control logic 202 provides the logical interface between interrupt agent 106 and its host electronic appliance 100. In this regard, control logic 202 may manage one or more aspects of interrupt agent 106 to provide a communication interface to electronic appliance 100, e.g., through memory controller 104.

According to one aspect of the present invention, though the claims are not so limited, control logic 202 may selectively invoke the resource(s) of interrupt engine 208. As part of an example method to generate an interrupt by monitoring an external interface, as explained in greater detail with reference to FIG. 3, control logic 202 may selectively invoke poll services 210 that may read the relevant internal status registers of I/O extender 110 and save a copy to memory 204. Control logic 202 also may selectively invoke update services 212 or trigger services 214, as explained in greater detail with reference to FIG. 3, to periodically update the saved relevant status of I/O extender 110 or initiate a software interrupt based on a predetermined change in the saved relevant status of I/O extender 110, respectively. As used herein, control logic 202 is intended to represent any of a wide variety of control logic known in the art and, as such, may well be implemented as a microprocessor, a microcontroller, a field-programmable gate array (FPGA), application specific integrated circuit (ASIC), programmable logic device (PLD) and the like. In some implementations, control logic 202 is intended to represent content (e.g., software instructions, etc.), which when executed implements the features of control logic 202 described herein.

Memory 204 is intended to represent any of a wide variety of memory devices and/or systems known in the art. According to one example implementation, though the claims are not so limited, memory 204 may well include volatile and non-volatile memory elements, possibly random access memory (RAM) and/or read only memory (ROM). Memory 204 may be used to store internal status information read from I/O extender 110, for example.

Extender interface 206 provides a path through which interrupt agent 106 can communicate with I/O extender 110. In one embodiment, extender interface 206 may represent any of a wide variety of controllers known in the art. In one embodiment, extender interface 206 may comply with the System Management Bus (SMBus) Specification, Version 2.0, SBS Implementers Forum, released Aug. 3, 2000. In another embodiment, extender interface 206 may represent an I²C bus.

As introduced above, interrupt engine 208 may be selectively invoked by control logic 202 to save relevant status of an I/O extender into a memory, to periodically update the saved relevant status of the I/O extender, or to trigger an interrupt based on a predefined change in the relevant status of the I/O extender. In accordance with the illustrated example implementation of FIG. 2, interrupt engine 208 is depicted comprising one or more of poll services 210, update services 212 and trigger services 214. Although depicted as a number of disparate elements, those skilled in the art will appreciate that one or more elements 210-214 of interrupt engine 208 may well be combined without deviating from the scope and spirit of the present invention.

Poll services 210, as introduced above, may provide interrupt agent 106 with the ability to read the relevant internal status registers of I/O extender 110 and save a copy to memory 204. In one example embodiment, poll services 210 may use a SMBus to communicate with I/O extender 110.

As introduced above, update services 212 may provide interrupt agent 106 with the ability to periodically update the saved relevant status of I/O extender 110. In one example embodiment, update services 212 may update the saved relevant status of I/O extender 110 after a predefined period of time.

Trigger services 214, as introduced above, may provide interrupt agent 106 with the ability to trigger an interrupt based on a predefined change in the saved relevant status. In one embodiment, trigger services 214 may respond to a change in the saved relevant status of I/O extender 110 by invoking instructions from another location. In another example embodiment, trigger services 214 may initiate an interrupt through memory controller 104, which may invoke instructions to respond to the change in status of I/O extender 110.

Figure 3:
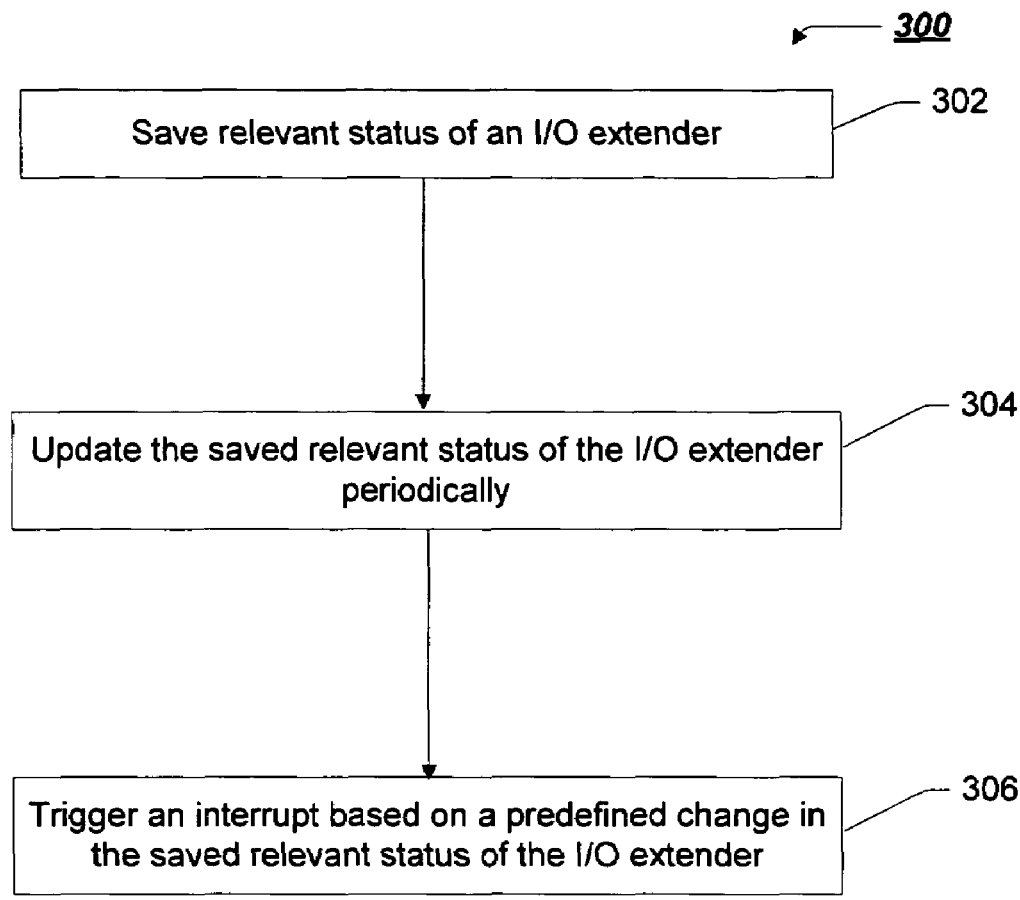
FIG. 3 is a flow chart of an example method to generate an interrupt by monitoring an external interface, in accordance with one example embodiment of the invention.

FIG. 3 is a flow chart of an example method to generate an interrupt by monitoring an external interface, in accordance with one example embodiment of the invention. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

According to but one example implementation, method 300 begins with poll services 210 being invoked to save (302) relevant internal status of I/O extender 110. In one example embodiment, the entire internal status of I/O extender 110 is copied into memory 204. In another example embodiment, only a relevant subset of the internal status of I/O extender 110 are copied based on predefined settings or usages.

Next, control logic 202 may selectively invoke update services 212 to update (304) the saved relevant status of I/O extender 110 periodically. In one example embodiment, the update period may be regular and predefined. In another example embodiment, the update period may be irregular and variable.

Next, trigger services 214 may trigger (306) an interrupt based on a predefined change in the saved relevant status of I/O extender 110. In one embodiment, a logical change in the relevant status of I/O extender 110 stored in memory 204 may trigger an interrupt through hardware. In another embodiment, trigger services 214 may periodically compare the relevant status of I/O extender 110 stored in memory 204 against predefined conditions for which an interrupt should be triggered.

Figure 4:
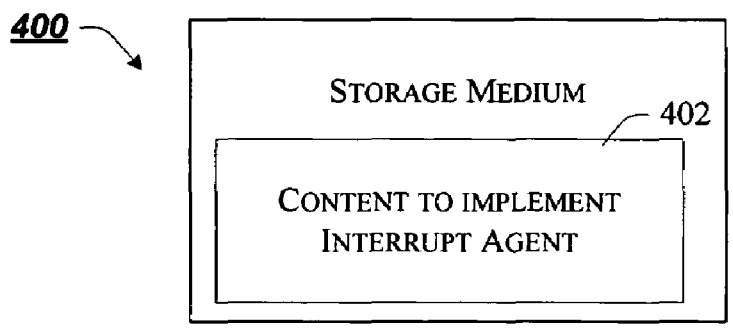
FIG. 4 is a block diagram of an example storage medium comprising content which, when accessed by a device, causes the device to implement one or more aspects of one or more embodiment(s) of the invention.

FIG. 4 illustrates a block diagram of an example storage medium comprising content which, when accessed by a device, causes the device to implement one or more embodiment(s) of the invention, for example interrupt agent 106 and/or associated method 300. In this regard, storage medium 400 includes content 402 (e.g., instructions, data, or any combination thereof) which, when executed, causes the appliance to implement one or more aspects of interrupt agent 106, described above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem, radio or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the invention disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. Note that the embodiments may be integrated into radio systems or hand-held portable devices, especially when devices depend on reduced power consumption and/or reduced board area. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept is anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A method comprising:
   communicating over a serial interface with an input/output (I/O) extender;
   saving a relevant status of the I/O extender in a memory separate from the I/O extender;
   periodically updating the saved relevant status of the I/O extender in the separate memory; and
   generating a system interrupt based on a change in the saved relevant status of the I/O extender in the separate memory without the use of an interrupt output from the I/O extender.

2. The method of claim 1, wherein communicating over a serial interface comprises:
   communicating over a System Management Bus (SM-Bus) Specification compliant interface.

3. The method of claim 1, further comprising:
   generating an interrupt in compliance with a Peripheral Component Interconnect (PCI) Standard Hot-Plug Controller (SHPC) and Subsystem Specification.

4. The method of claim 1, wherein the I/O extender comprises a Philips 9555 component.

5. An electronic appliance, comprising:
a processor;
an input/output (I/O) extender;
an I/O device coupled with the I/O extender; and
an interrupt engine coupled with the processor and the I/O extender, the interrupt engine to communicate with the I/O extender, the interrupt engine to save a relevant status of the I/O extender in a memory separate from the I/O extender, the interrupt engine to periodically update the saved relevant status of the I/O extender in the separate memory, and the interrupt engine to generate a system interrupt based on a change in the saved relevant status of the I/O extender in the separate memory without the use of an interrupt output from the I/O extender.

6. The electronic appliance of claim 5, further comprising:
the interrupt engine to generate an interrupt based on a change in the relevant status of the I/O extender without the use of an interrupt signal from the I/O extender.

7. The electronic appliance of claim 6, further comprising:
the interrupt engine to generate an interrupt in compliance with a Peripheral Component Interconnect (PCI) Standard Hot-Plug Controller (SHPC) and Subsystem Specification.

8. The electronic appliance of claim 6, wherein the I/O extender comprises:
a Philips 9555 component.

9. A storage medium comprising content which, when executed by the accessing machine, causes the accessing machine to communicate over a serial interface with an input/output (I/O) extender, to save a relevant status of the I/O extender in a memory separate from the I/O extender, to periodically update the saved relevant status of the I/O extender in the separate memory, and to generate a system interrupt based on a change in the saved relevant status of the I/O extender in the separate memory without the use of an interrupt output from the I/O extender.

10. The storage medium of claim 9, wherein the content to communicate over a serial interface comprises content which, when executed by the accessing machine, causes the accessing machine to communicate over a System Management Bus (SMBus) Specification compliant interface.

11. The storage medium of claim 10, further comprising content which, when executed by the accessing machine, causes the accessing machine to generate an interrupt in compliance with a Peripheral Component Interconnect (PCI) Standard Hot-Plug Controller (SHPC) and Subsystem Specification.

12. The storage medium of claim 10, wherein the content to communicate with an I/O extender comprises content which, when executed by the accessing machine, causes the accessing machine to communicate with a Philips 9555 component.

* * * * *